United States Patent [19]

Pearce et al.

[11] Patent Number: 5,896,534
[45] Date of Patent: Apr. 20, 1999

[54] OPERATING SYSTEM INDEPENDENT APPARATUS AND METHOD FOR SUPPORTING INPUT/OUTPUT DEVICES UNSUPPORTED BY EXECUTING PROGRAMS

[75] Inventors: John J. Pearce; Kendall C. Witte, both of Austin, Tex.

[73] Assignee: Dell USA, L.P., Round Rock, Tex.

[21] Appl. No.: 08/592,505

[22] Filed: Jan. 26, 1996

[51] Int. Cl.[6] .......................... G06F 15/163; G06F 3/00; G06F 9/46
[52] U.S. Cl. ...................... 395/680; 395/733; 395/500
[58] Field of Search .......................... 395/680, 681, 395/471, 183.14, 682–685, 733–742, 500, 527, 704, 568, 825, 837, 856, 882, 822

[56] References Cited

U.S. PATENT DOCUMENTS

| | | | |
|---|---|---|---|
| 5,121,472 | 6/1992 | Danish et al. | 395/275 |
| 5,175,853 | 12/1992 | Kardach et al. | 395/650 |
| 5,214,785 | 5/1993 | Fairweather | 395/800 |
| 5,237,692 | 8/1993 | Raasch et al. | 395/725 |
| 5,261,079 | 11/1993 | Celi, Jr. | 395/500 |
| 5,357,628 | 10/1994 | Yuen | 395/575 |
| 5,465,364 | 11/1995 | Lathrop et al. | 395/681 |
| 5,485,614 | 1/1996 | Kocis et al. | 361/680 |
| 5,544,344 | 8/1996 | Frame et al. | 395/471 |
| 5,590,312 | 12/1996 | Marisetty | 395/500 |
| 5,617,572 | 4/1997 | Pearce et al. | 395/750 |
| 5,623,673 | 4/1997 | Gephardt et al. | 395/733 |
| 5,623,696 | 4/1997 | Johnson et al. | 395/681 |
| 5,630,052 | 5/1997 | Shah | 395/183.14 |
| 5,634,132 | 5/1997 | Pearce et al. | 395/750 |
| 5,680,540 | 10/1997 | Pearce | 395/182.22 |
| 5,737,579 | 4/1998 | Kimura et al. | 395/500 |
| 5,802,318 | 9/1998 | Murray et al. | 395/733 |

OTHER PUBLICATIONS

Intel 486 Processor Family, pp. 1–8, 125–142, Nov. 1994.
Intel, Managing Power with the SL Enhanced Intel486 Microporcessor, pp. 3–9, 1993.
Intel, Migrating from the Intel 486 SL Microporcessor to the SL Enhanced Intel 486 Microprocessor, pp. 1–13, Oct. 1993.
Slater, Michael; "Universal bus to simplify PC I/O", Microdesign Resources, v9, n5, p 1(5), Apr. 17, 1995.
Caton,Michael "USB makes the right connections", PC Week, v12,n44, p 96(1), Nov. 6, 1995.

*Primary Examiner*—Majid A. Banankhah
*Assistant Examiner*—Patricia Caldwell
*Attorney, Agent, or Firm*—Skjerven, Morrill, MacPherson, Franklin & Friel LLP; Kent B. Chambers

[57] ABSTRACT

A conversion methodology utilizes increasing microprocessor performance characteristics and System Management Mode ("SMM") to provide transparent support of hardware components that include features unsupported by executing application and operating system programs. In one embodiment, a PC system includes code that supports only conventional but unavailable communication interfaces. However, the PC system is equipped with a universal serial bus ("USB") controller. Although the USB controller is unsupported by the executing code by the application and operating system programs, the conversion methodology utilizes system management mode to facilitate transparent support for the USB controller. In SMM, a CPU executes SMM code independently of the operating system(s). The conversion methodology causes entry of SMM upon any I/O operation intended for the supported but unavailable conventional communication interfaces. The SMM code provides data from the USB controller in a format recognizable to the requesting non-supporting software. SMM code supports providing all da[]t that would otherwise be provided to supporting software.

22 Claims, 6 Drawing Sheets

OPERATING SYSTEM INDEPENDENT APPARATUS AND METHOD FOR SUPPORTING INPUT/OUTPUT DEVICES UNSUPPORTED BY EXECUTING PROGRAMS

FIELD OF THE INVENTION

This invention relates in general to computer systems and, more particularly, to an apparatus and method for supporting, independent of an operating system, hardware components that are unsupported by application and operating system software, attempts to access supported, but unavailable hardware components and for converting unsupported hardware component input/output operations into a format recognizable to application and operating system software and the unsupported hardware components.

BACKGROUND OF THE INVENTION

Personal computer ("PC") systems in general and IBM compatible PC systems in particular have attained widespread use. These PC systems handle information and primarily give independent computing power to a single user (or a relatively small group of users in the case of a PC network). Such PC systems are generally inexpensively priced for purchase by individuals or small businesses and provide computing power to many segments of today's modem society.

A PC system can usually be defined as a desktop, floor-standing, or portable microcomputer that includes a system unit having a central processing unit ("CPU") typically associated with devices such as volatile and non-volatile memory, a display monitor, a keyboard, one or more floppy diskette drives, a hard disk storage device, an optional CD-ROM drive, and an optional printer. A PC system may a include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other PC systems. These I/O devices are typically plugged into connectors of computer system I/O interfaces such as serial interfaces and parallel interfaces, for example. Generally, these PC systems use a system board or motherboard to electrically interconnect these devices.

PC systems also typically include basic input/output system ("BIOS") programs to ease programmer/user interaction with the PC system devices. More specifically, BIOS provides a software interface between the system hardware and the operating system/application program. The operating system ("OS") and application program typically access BIOS rather than directly manipulating I/O ports, registers, and control words of the specific system hardware. Well known device drivers and interrupt handlers access BIOS to, for example, facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM, where it is nonvolatily stored, to main memory from which it is executed. This practice is referred to as "shadowing" or "shadow RAM" and increases the speed at which BIOS executes.

Although the CPU provides the "kernel" of the PC system, I/O communication between an I/O device and the CPU forms a basic feature of PC systems. Many I/O devices include specialized hardware worldling in conjunction with OS specific device drivers and BIOS routines to perform functions such as information transfer between the CPU and external devices, such as modems and printers, coupled to I/O devices.

Referring to FIG. 1, well-known PC system serial and parallel communication system 100 is illustrated as an example of such I/O devices. PC communication system 100 facilitates both serial and data transfer between devices external to the PC system incorporating PC communication system 100. Although, serial interface 106 receives data in parallel, i.e. multiple, simultaneous data streams, from I/O controller 104 via bus 110, serial interface 106 transmits/receives data in a serial data stream, via data link 114, to/from external communication device 118. Serially communicating external communication devices are well-known and include keyboards, modems, mice, and joysticks. Serial interface 106 is often designated as a COM port and, especially in an IBM™ compatible PC system, may be an Intel™ UART ("Universal Asynchronous Receiver and Transmitter") 8250, 16450, or 16550 chip.

PC communication system 100 also includes a parallel interface that receives data in parallel from I/O controller 104 via bus 112. Unlike serial interface 106, parallel interface 108 also transmits/receives data in parallel to/from external communication device 120 which may be, for example, a printer. Data is generally ultimately transferred between serial interface 106 and a PC system CPU and parallel interface 108 and the PC system CPU via a bus system that includes, for example, ISA ("Industry Standard Architecture") bus 102 which is connected to I/O controller 104.

Referring to FIG. 2, a PC system chassis 202 back plate is illustrated. The backplate illustrates a typical multiplicity of serial connectors 206, 208, 210, parallel connector 204, and video connector 212. Each of the connectors provide communication access to serial interfaces, a parallel interface, and graphics controller, respectively. Each of the different types of connectors generally utilize a unique "pin-out", i.e. pin configuration, and occupy a substantial amount of physical space not only on the PC system chassis 202 backplate but also within PC system chassis 202.

Parallel and serial interfaces are currently very common I/O devices for facilitating communication between PC computer systems and external devices including other PC computer systems. Control and monitoring of the PC system hardware, including the parallel and serial interfaces of FIG. 1, are generally the responsibility of the PC computer system OS which mainly uses device specific driver routines to access PC system hardware. Conventional application programs include specific instructions for, for example, device specific data transfer, device specific control, and obtaining specific device status information. Primarily, these instructions take the form of write data to [device address] or read data from [device address]. In response, device specific driver routines are utilized to facilitate implementation of these application instructions. Additionally, I/O device logical addresses are typically well-known and specific I/O device drivers generally attempt to access known logical addresses.

FIGS. 3 and 4 illustrate respective conventional parallel interface and serial interface block level interconnect topologies. A brief operational description below of some basic differences between parallel and serial interfaces enhances the reason for using device specific drivers and instructions.

FIG. 3 illustrates parallel interface 108 in more detail. Parallel interface 108 includes a number of registers which are accessed via an OS specific device driver tailored to the requirements of an external device (not shown) connected to parallel connector 302. The parallel interface 108 is assigned a logical base address, such as 378h and 278h, which is utilized by a device driver to access parallel interface 108. (The "h" suffix is used to designate a hexadecimal value). In operation, after receiving data from a printer (not shown) connected to parallel interface 108, a printer driver services the parallel interface 108. Printer driver servicing occurs in response to a parallel interface 108 request for CPU servicing, via bus 112, by instructing interrupt logic 304 to issue a hardware interrupt request. The printer driver responds to the interrupt request, addresses parallel interface 108, and retrieves received data from data register 306. The received data may be subsequently accessed by an application program executing in the PC system incorporating parallel interface 108.

Application programs may also transfer or write information to 8-bit data register 306 using well known commands that request the printer driver to output data to data register 306. By writing to control register 308, application programs may control parallel interface 108 behavior as well as control a connected external device via several well-known control commands. Control register 308 also controls generation of the hardware interrupts. Status register 310, which may generally only be read, reflects a current status of a connected external device. Address decode control 312 decodes address signals transmitted via bus 112 to determine whether a parallel interface 108 is selected by a CPU.

Referring to FIG. 4, serial interface 106 is illustrated in more detail. Serial interface 106 is also assigned a logical base address, such as 03F8h, 02F8h, 03E8h, or 02E8h, which is utilized by a device driver to access serial interface 106. Serial interface 106 transmits exemplary serial data unit 402 and receives exemplary serial data unit 404 using one of a variety of well-known protocols. An application instructs a CPU to transmit specific data to serial interface 106, and a device driver fetches the data to be transmitted and writes the data to transmitter hold register 406 via bus 110. The data is framed with overhead bits into a selected serial data unit protocol by SDU ("serial data unit") logic 408. Transmitter shift register 410 provides individual bits of exemplary serial data unit 402 to a connected external device. The reception of exemplary serial data unit 404 proceeds inversely to the transmission of serial data unit 402 uses receiver shift register 412, SDU logic 408, and receiver buffer register 414. As with parallel interface 108, serial interface 106, transmitter hold register 406, SDU logic 408, transmitter shift register 410, receiver shift register 412, and receiver buffer register 414 all operate in conjunction with baud rate signals provided by interface control baudrate generator 416.

Relatively recently a new standard for external device communication has been instituted which calls for Universal Serial Bus implementation. Universal Serial Bus is a technology standard established through a cooperative effort of Compaq Corp., Digital Equipment Corp., IBM PC Co., Intel Corp., Microsoft Corp., NEC Corp., and Northern Telecom Corp. The USB standard and its hardware and software implementation are well-known. However, many existing applications and operating systems cannot communicate with USB hardware, including USB controllers. As a result, PC systems utilizing USB hardware currently cannot use many existing application programs and operating systems that do not include USB compatible instructions. Therefore, currently in order to utilize application programs and operating systems designed for conventional parallel and serial interfaces or for USB hardware, a PC system must include both parallel and serial interface hardware and USB hardware.

SUMMARY OF THE INVENTION

PC systems require software such as application code and operating systems in order to provide their intended functions. This software contains various features to support generally standardized hardware components. However, hardware components operating with a variety of characteristics and according to a variety of standards are often introduced in PC systems. Often before a hardware component becomes a standard feature or operates according to an established standard, a transition period occurs, and existing software may not fully support all of the PC system's hardware components. As a result, the PC system user is confronted with the potentially disadvantageous choices of purchasing newer versions of software, foregoing the purchase of improved but unsupported hardware components, or purchasing hardware components of limited use due to the lack of supporting software. However, existing software is typically capable of supporting hardware, not present within the users PC system, that attempts to provide at least somewhat similar high level operations.

The present invention offers a solution which in one embodiment provides a seamless and transparent conversion interface to executing code attempting to access a supported but unavailable PC system component. In an embodiment of the present invention, PC systems may include both non-USB compatible and USB compatible application and operating system programs while having only USB hardware for external device communication.

In one embodiment of the present invention is a computer system includes a memory having a program stored therein, a hardware device having an address and at least partially unsupported by the program, a processor, coupled to the memory and the hardware device, that facilitates, during operation, attempted first information transfer from the program to an address range and facilitates second information transfer from the hardware device to the program, and a converter, stored in the memory and executable by the processor, having access to the transferred information to convert the attempted first information transfer into a form recognizable by the hardware device and transfer the converted information to the hardware device and to convert the second information transfer into a form recognizable by the program.

In another embodiment, of the present invention, a method of interfacing between a program executing in a computer system and a hardware device includes the steps of attempting to transfer information between the program and the hardware device, converting any information directed to a predetermined address range into a format recognizable by the hardware device, transferring any converted information directed to the address range to the hardware device, converting any information from the hardware device into a format recognizable by the program, and transferring any converted hardware device information to the program.

BRIEF DESCRIPTION OF THE DRAWINGS

The same feature appearing in multiple figures has the same reference numeral.

DETAILED DESCRIPTION

The following description of the invention is intended to be illustrative only and not limiting.

In the following description, italicized words or phrases represent executable pseudocode.

Figure 5:
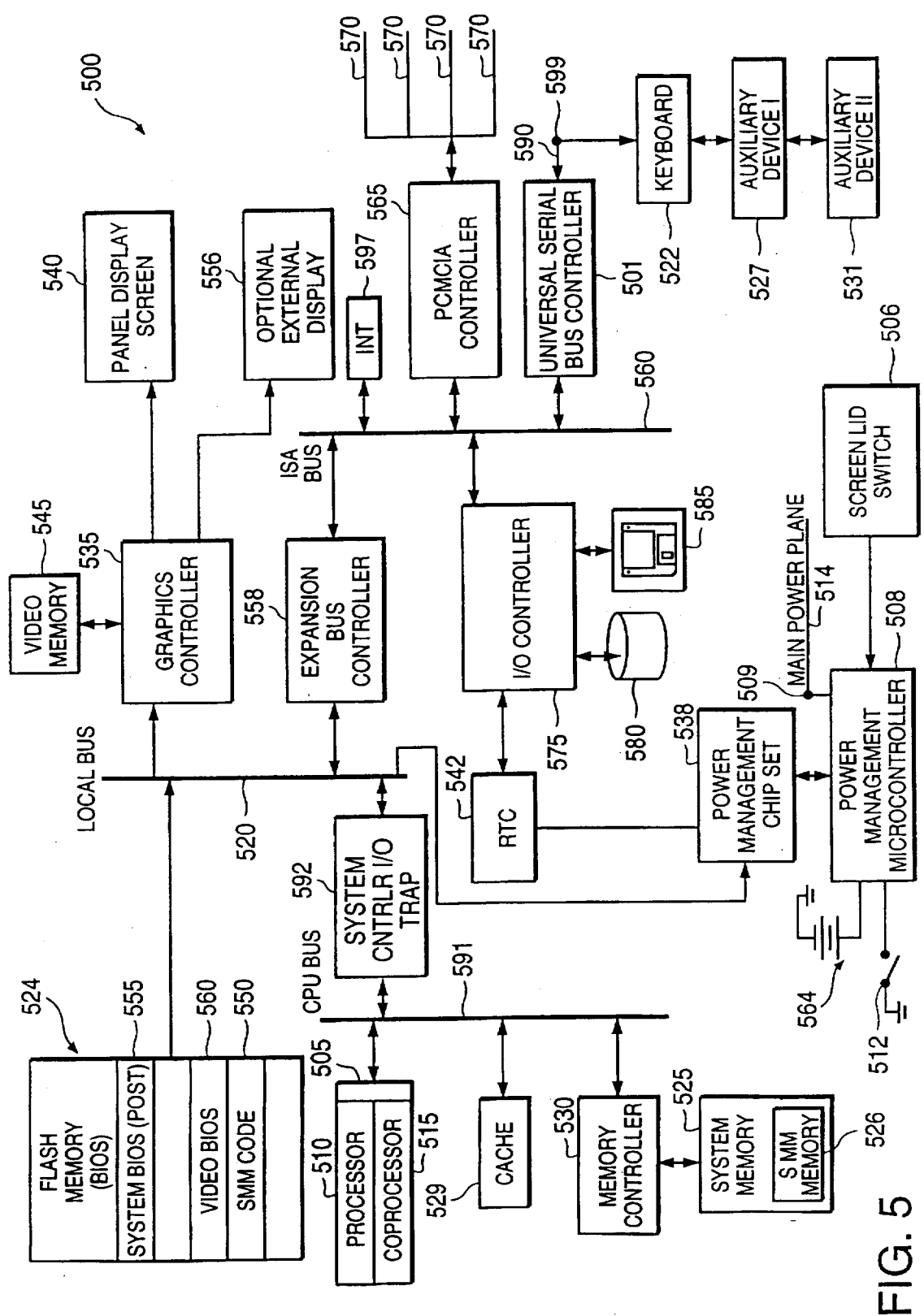
FIG. 5 is a block diagram of the disclosed PC computer system.

Referring to FIG. 5 PC system 500 includes a microprocessor ("CPU") 505, for example, an Intel™ Pentium™ class microprocessor or Intel™ 80486 class microprocessor, having a processor 510 for handling integer operations and a coprocessor 515 for handling floating point operations. CPU 505 is coupled to cache 529 and memory controller 530 via CPU bus 591. System controller I/O trap 592 couples CPU bus 591 to local bus 520 and is generally characterized as part of a system controller such as a Pico Power Vesuvious or an Intel™ Mobile Triton chip set. System controller I/O trap 592 can be programmed in a well-known manner to intercept a particular target address or address range, and, upon intercepting a target address, system controller I/O trap 592 asserts an intercept signal indicating that CPU 505 attempted to access the target address. In the conversion methodology embodiment of FIG. 8, the intercept signal is coupled to an SMI ("system management interrupt") pin of CPU 505 to cause CPU 505 to enter system management mode ("SMM").

A main memory 525 of dynamic random access memory ("DRAM") modules is coupled to local bus 520 by a memory controller 530. Main memory 525 includes a system management mode memory area which is employed to store converter code to implement conversion methodology embodiments as will be discussed in more detail subsequently.

A (BIOS) memory 524 is coupled to local bus 520. A FLASH memory or other nonvolatile memory is used as BIOS memory 524. BIOS memory 524 stores the system code which controls some PC system 500 operations as discussed above.

A graphics controller 535 is coupled to local bus 520 and to a panel display screen 540. Graphics controller 535 is also coupled to a video memory 545 which stores information to be displayed on panel display 540. Panel display 540 is typically an active matrix or passive matrix liquid crystal display ("LCD") although other display technologies may be used as well. Graphics controller 535 can also be coupled to an optional external display or standalone monitor display 556 as shown in FIG. 5. One graphics controller that can be employed as graphics controller 535 is the Western Digital WD90C24A graphics controller.

A bus interface controller or expansion bus controller 558 couples local bus 520 to an expansion bus 560. In this particular embodiment, expansion bus 560 is an Industry Standard Architecture ("ISA") bus although other buses, for example, a Peripheral Component Interconnect ("PCI") bus, could also be used. A personal computer memory card international association ("PCMCIA") controller 565 is also coupled to expansion bus 560 as shown. PCMCIA controller 565 is coupled to a plurality of expansion slots 570 to receive PCMCIA expansion cards such as modems, fax cards, communications cards, and other input/output devices. Interrupt request generator 597 is also coupled to ISA bus 560 and issues an interrupt service request over a predetermined interrupt request line after receiving a request to issue interrupt instruction from CPU 505.

An I/O controller 575, often referred to as a super I/O controller is coupled to ISA bus 560. I/O controller 575 interfaces to both an integrated drive electronics ("IDE") hard drive 580 and a floppy drive 585.

USB controller 501 transfers data to and from CPU 510 via ISA bus 560. Keyboard 522, auxiliary device I 527, and auxiliary device II 531 are connected serially to USB connector 599. This interconnection topology is implemented according to the USB technology standard. External devices which include keyboard 522, auxiliary device I 527, and auxiliary device II 531 communicate with CPU 505 via USB controller 501. Auxiliary devices may be any communication device such as a mouse, modem joystick, or another PC system. When USB controller 501 receives data from the connected external devices, USB controller 501 issues an interrupt request to CPU 505. CPU 505 interprets the interrupt request as a request for service from a conventional communication interface and attempts to process the interrupt request accordingly. However, as described in more detail below, a USB servicing routine is executed instead.

PC system 500 includes a power supply 564, for example, a battery, which provides power to the many devices which form PC system 500. Power supply 564 is typically a rechargeable battery, such as a nickel metal hydride ("NiMH") or lithium ion battery, when PC system 500 is embodied as a portable or notebook computer. Power supply 564 is coupled to a power management microcontroller 508 which controls the distribution of power from power supply 564. More specifically, microcontroller 508 includes a power output 509 coupled to the main power plane 514 which supplies power to CPU 505. Power microcontroller 508 is also coupled to a power plane (not shown) which supplies power to panel display 540. In this particular embodiment, power control microcontroller 508 is a Motorola 6805 microcontroller. Microcontroller 508 monitors the charge level of power supply 564 to determine when to charge and when not to charge battery 564. Microcontroller 508 is coupled to a main power switch 512 which the user actuates to turn the PC system 500 on and off. While microcontroller 508 powers down other portions of PC system 500 such as hard drive 580 when not in use to conserve power, microcontroller 508 itself is always coupled to a source of energy, namely power supply 564.

In a portable embodiment, PC system 500 also includes a screen lid switch 506 or indicator 506 which provides an indication of when panel display 540 is in the open position and an indication of when panel display 540 is in the closed position. It is noted that panel display 540 is generally located in the same location in the lid of the computer as is typical for "clamshell" types of portable computers such as laptop or notebook computers. In this manner, the display screen forms an integral part of the lid of the computer which swings from an open position for interaction with the user to a close position.

PC system 500 also includes a power management chip set 538 which includes power management chip models PT86C521 and PT86C522 manufactured by Pico Power. Power management chip set 538 is coupled to CPU 505 via local bus 520 so that power management chip set 538 can receive power control commands from CPU 505. Power management chip set 538 is connected to a plurality of individual power planes which supply power to respective devices in PC system 500 such as hard drive 580 and floppy drive 585, for example. In this manner, power management chip set 538 acts under the direction of CPU 505 to control the power to the various power planes and devices of the computer. A real time clock ("RTC") 540 is coupled to I/O controller 575 and power management chip set 538 such that time events or alarms can be transmitted to power management chip set 538. Real time clock 540 can be programmed to generate an alarm signal at a predetermined time.

When PC system 500 is turned on or powered up, the system BIOS software stored in non-volatile BIOS memory 524 is copied into main memory 525 so that it can be executed more quickly. This technique is referred to as "shadowing" or "shadow RAM" as discussed above. At this time, SMM code 650 is also copied into the system management mode memory area 526 of main memory 525. CPU 505 executes SMM code 650 after CPU 505 receives a system management interrupt ("SMI") which causes the microprocessor to enter SMM. Additional conditions under which an SMI is generated are discussed subsequently. It is noted that along with SMM code 650, also stored in BIOS memory 524 and copied into main memory 525 at power up are system BIOS 555 (including a power on self test module-POST) and video BIOS 560. It will be recognized by those of ordinary skill in the art that other memory mapping schemes may be used. For example, SMM code 650 may be stored in fast SRAM memory (not shown) coupled to the local/CPU bus 520.

Figure 1:
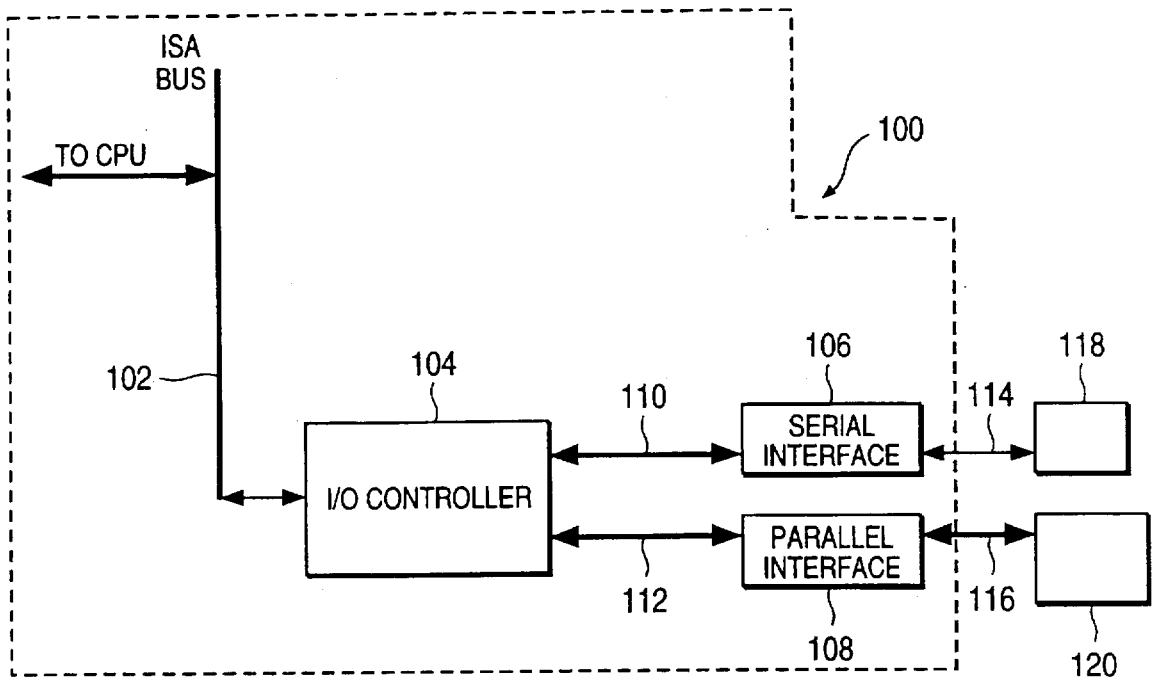
FIG. 1, labeled prior art, is a PC system serial and parallel communication system.
Figure 2:
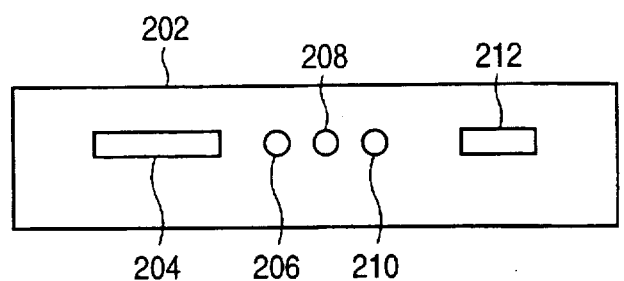
FIG. 2, labeled prior art, illustrates a PC system chassis backplate having parallel and serial interface connectors.
Figure 3:
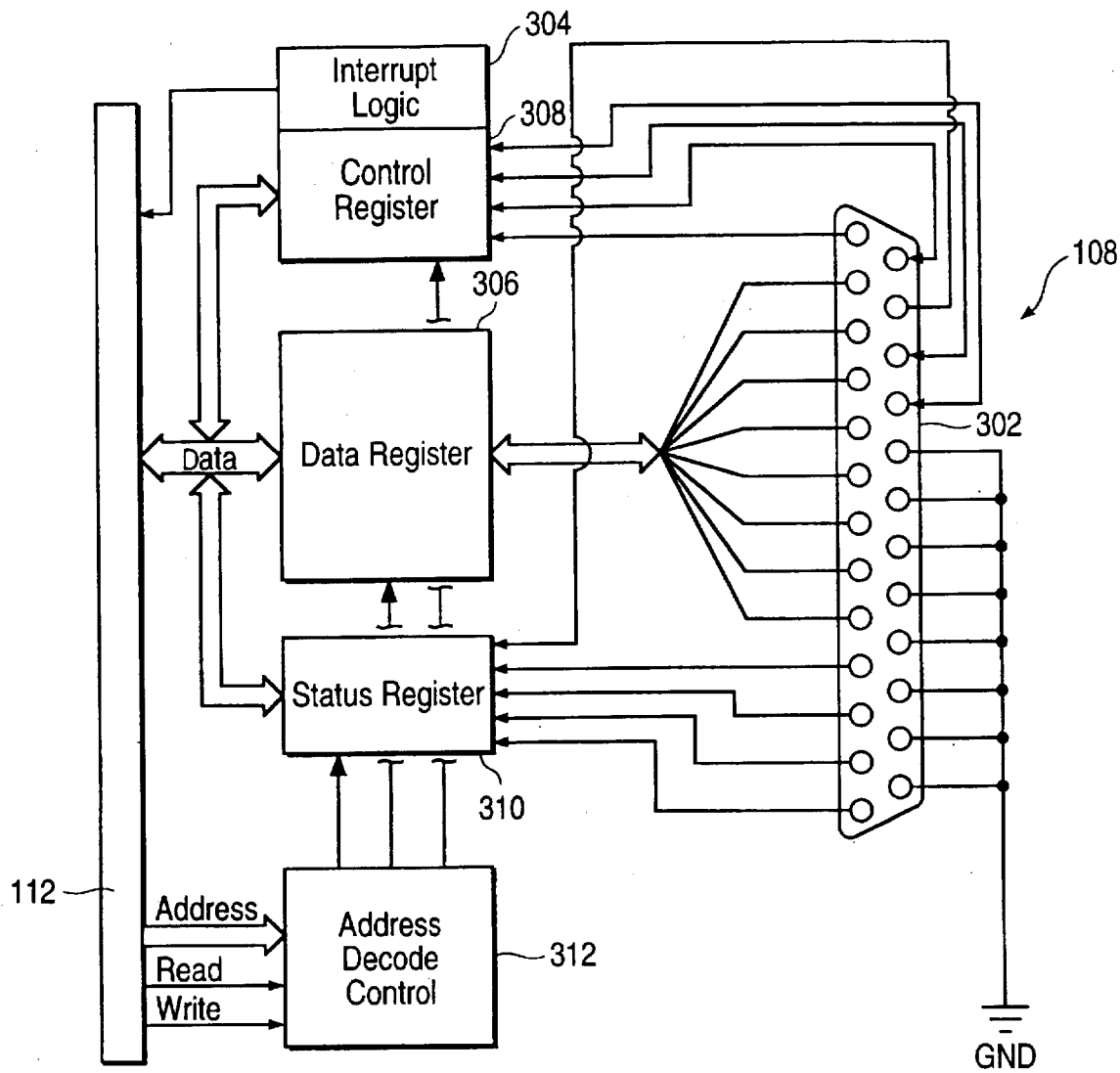
FIG. 3, labeled prior art is a block level parallel interface interconnection diagram FIG. 4, labeled prior art is a block level serial interface interconnection diagram.
Figure 4:
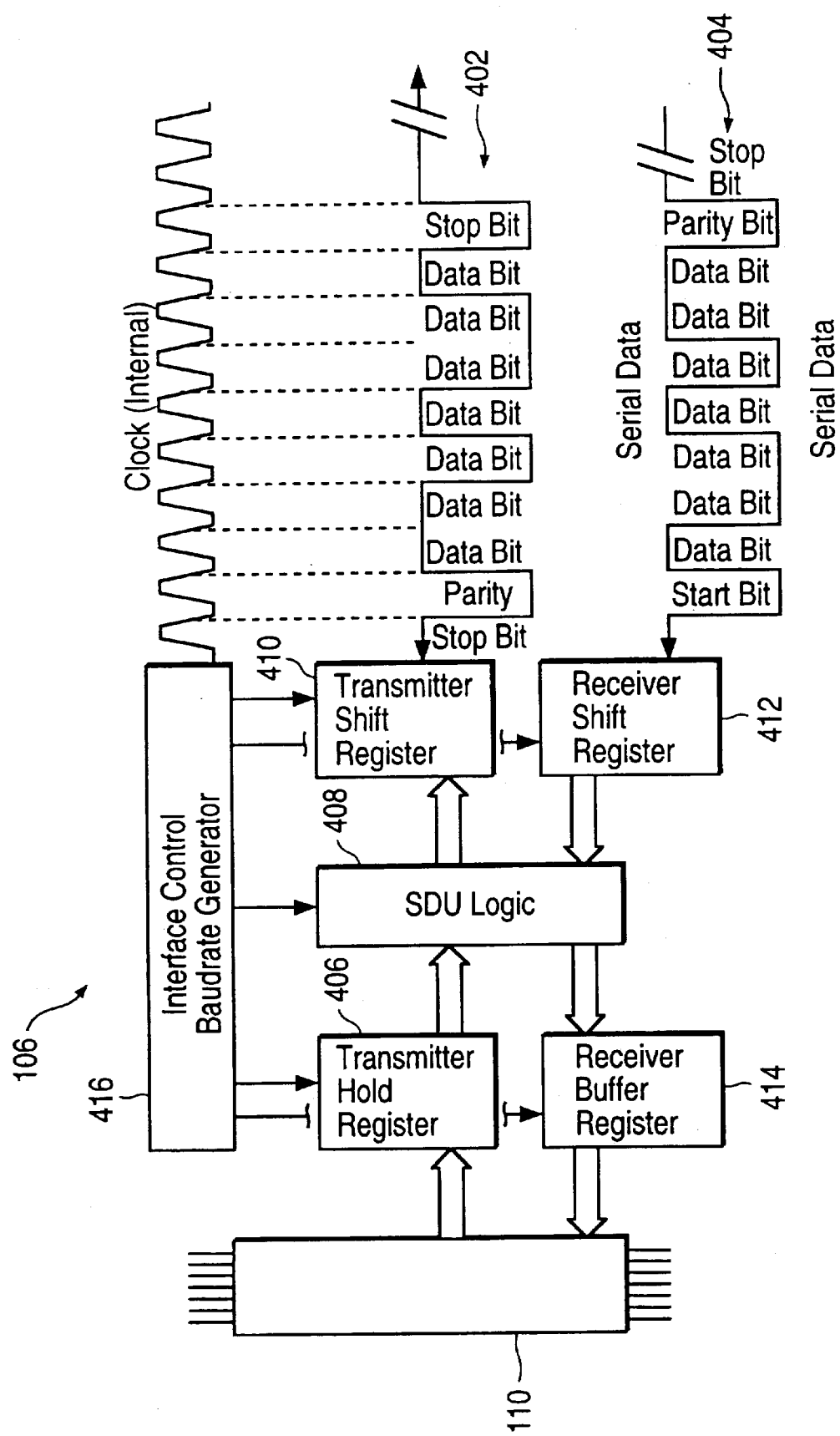
Figure 6:
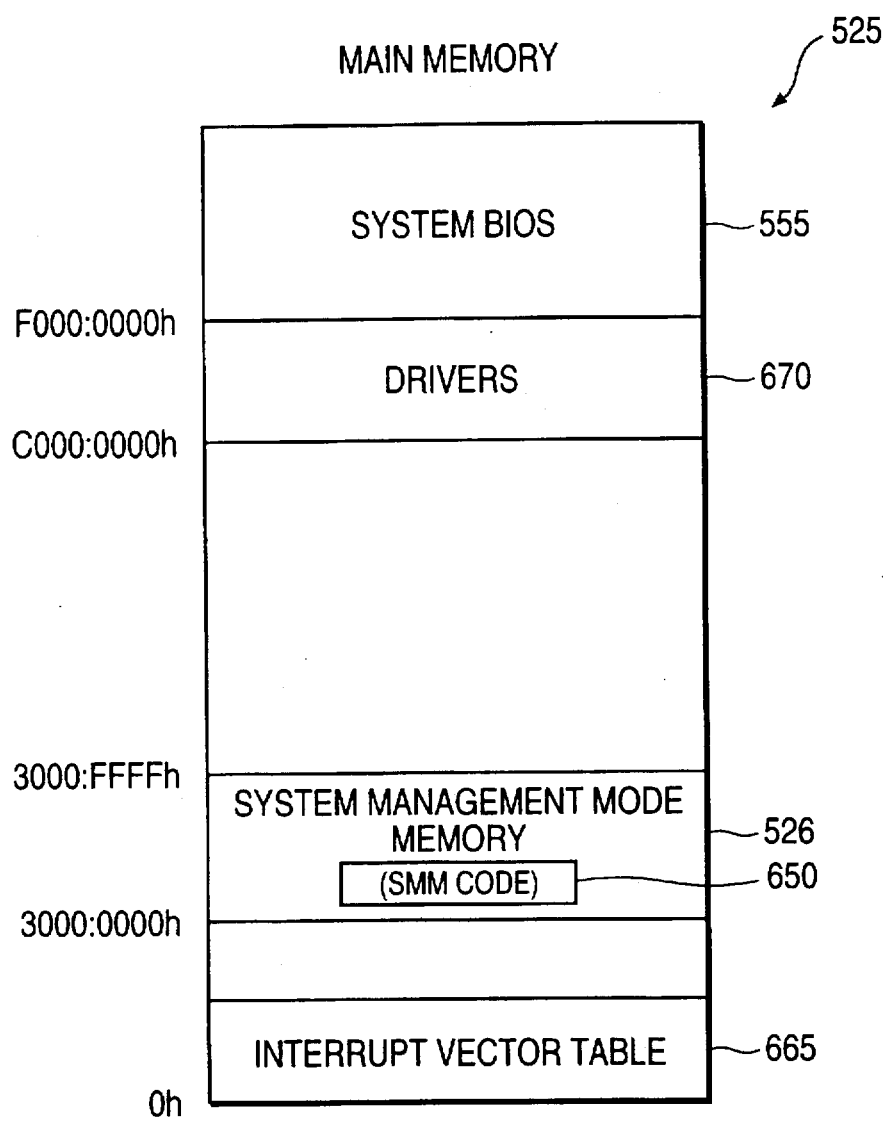
FIG. 6 is a representation of the main memory of the computer system of FIG. 5.

Referring to FIG. 6, a diagram of main memory 525 illustrates SMM code 650 storage in system management mode memory area 526 after being loaded into main memory 525. In this particular embodiment, SMM memory area 526 resides between main memory addresses 3000:0000h and 3000:FFFFh. Although SMM memory area 526 includes only 64 Kbytes, microprocessors such as the Pentium™ microprocessor can also access data outside system management mode memory area 526. Also loaded in main memory 525 at power up is an interrupt vector table 665 which is part of the system BIOS and directs the CPU 505 to particular interrupt handlers. Main memory 525 also includes device drivers 670 such as parallel and serial interface drivers. Memory areas not otherwise designated in main memory 525 of FIG. 4 are available for the operating system and user application programs.

Figure 7:
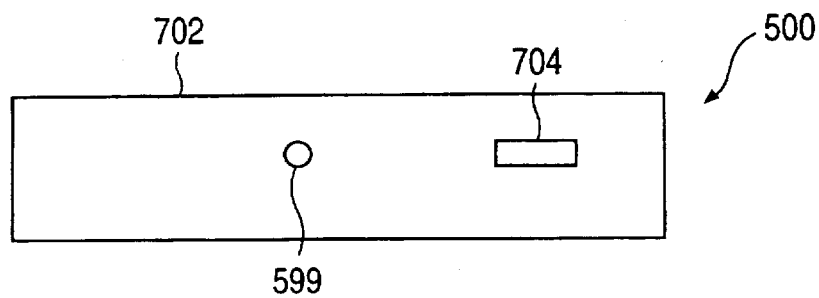
FIG. 7 illustrates a PC system chassis backplate having a single USB connector.

Referring to FIG. 7, PC system 500 chassis backplate 702 is illustrated. Note that PC system 500 only requires a single USB connector 599 to communicate with a plurality of external communication devices. PC system 704 also includes a video connector, although another communication standard, the VESA Enhanced Video connector standard, incorporates video communication into a single controller and connector as well.

Figure 8:
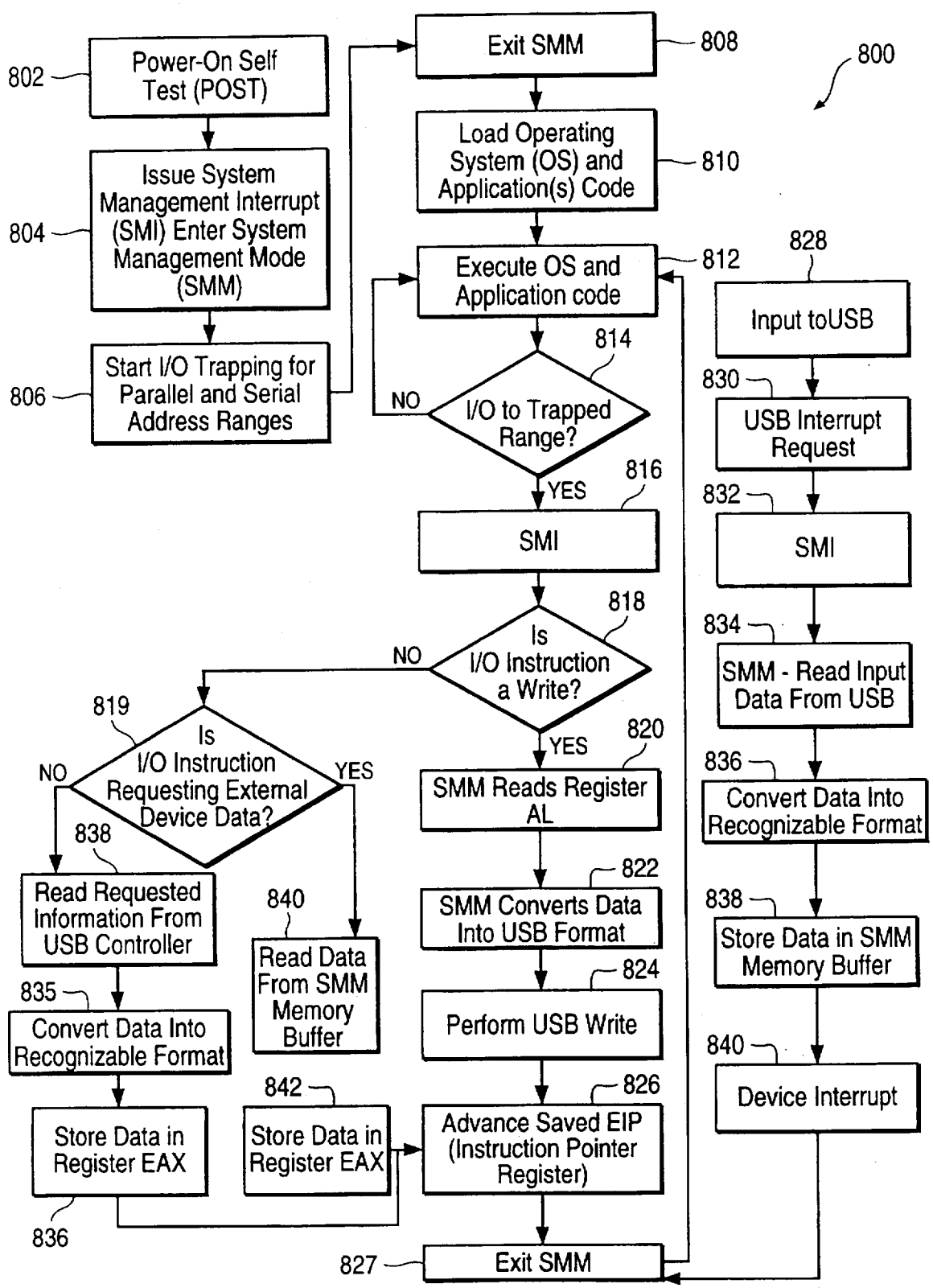
FIG. 8 is a flow chart depicting the process flow of a conventional I/O attempted access to USB access conversion methodology.

Referring to FIG. 8, with the system BIOS 555 thus copied into main memory 525, the power-on-self-test ("POST") module of BIOS executes to commence initialization of PC system 500 as block 802 indicates. The POST routine includes verification of system hardware functionality such as hard disk drive 580, CPU 505 registers, and floppy disk drive 585. If the POST attempts to access a communication interface not present in PC system 500, conversion methodology 800 will provide any requested data to the POST module. At this point, BIOS issues an SMI which causes CPU 505, in a well-known manner, to store current register values necessary to restore the original condition in main memory 525, initialize CPU 505 registers for SMN, and enter SMM as per block 804. Upon entering system management mode, I/O trapping of addresses within the range of addresses conventionally assigned to serial and parallel interfaces is initiated and commences as per block 806. This I/O trapping is implemented as discussed above by programming system controller I/O trap 592 to intercept I/O activity involving an address within a predetermined address range, such as 03F8h, 02F8h, 03E8h, 02E8h, 378h, and 278h, associated with serial and parallel interfaces. System controller I/O trap 592 is also programmed to intercept communication between the USB controller 501 and CPU 505. One implementation embodiment of block 806 uses SMM code 650 to program system controller I/O trap 592 to intercept an attempted access by CPU 505 to the interface address range. When system controller I/O trap 592 intercepts a target address, the I/O trap output signal line connected to the SMI pin of CPU 505 is activated causing CPU 505 to enter SMM as discussed above.

Once I/O trapping has started, SMM is exited as per block 808 with an explicit resume from system management mode instruction such as RSM. The operating system and applications software are now loaded as per block 810. Execution of the operating system and applications software code commences at block 812.

With I/O trapping commenced, system controller I/O trap 592 traps all I/O addresses within a predetermined range that propagate between local bus 520 and CPU bus 591 as indicated in decision block 814. If the I/O address does not fall within the predetermined address range, the application code and OS continue executing. In this embodiment, system controller I/O trap 592 conducts a test to determine if an application code attempted to output information to a parallel interface or serial interface address range of 03F8h, 02F8h, 03E8h, 02E8h, 378h, and 278h. This determination can be made, for example, by examining any I/O to the device instruction and comparing the associated instruction destination address with 03F8h, 02F8h, 03E8h, 02E8h, 378h, and 278h, 3Bch. If the intercepted address is within the range previously determined and subsequently programmed by SMM code into system controller I/O trap 592, system controller I/O trap 592 traps the destination address and issues an SMI activation signal on the SMI pin of CPU 508. With the SMI issue, a system management interrupt occurs as indicated in block 816, and CPU 508 stores its current registers, including the current code segment ("CS") and extended instruction pointer ("EIP") registers, and begins executing SMN code in system management memory 526 (FIG. 6).

Conversion methodology 800 next determines whether or not the I/O instruction to the trapped range from the application code was a write or read instruction to the trapped range as indicated in decision block 818. In one embodiment, SMM code 650 uses the contents of the EIP register to examine the instruction that caused the SMI to issue. If SMM code 650 determines that the instruction requested a write operation (output to I/O device), SMM code 650 requests CPU 305 to read the contents of register AL as indicated in block 820. Block 820 indicates that the contents of register AL are read to determine the I/O information content written by the application program. In popular Intel™ microprocessors and compatibles, register EAX contains the information to be written to I/O devices including communication interfaces. Register AL contains the least significant byte of information in extended accumulator register EAX. In this embodiment, AL contains the complete I/O information content because information written to an I/O device can be constrained to be only one byte wide, and only AL need be read by SMM code 650. However, in other embodiments, EAX may be read wholly or partially as necessary according to the width of the data content transferred between an I/O device and a CPU.

After reading the contents of AL, SMM code 650 converts the data intended to be written to a serial or parallel interface, into a well-known USB format as indicated in block 822. SMM code 650 next, using well-known USB control instructions, requests CPU 505 to write the converted data to the USB controller 501. The type of instruction written to the parallel and serial interfaces can be determined by examining the application or OS instruction code and/or the destination address of the attempted write operation. For example, SMM code 650 recognizes a parallel interface control register address, and would convert the requested parallel interface control instruction to a corresponding USB control instruction.

After performing the function requested by the application, the saved contents of register EIP, are advanced according to the length of the requested operation, as indicated in block 826, so that CPU 505 executes the next application code instruction once emulation methodology returns to block 812. A resume from system management mode instruction is executed to exit SMM as indicated in block 827. Conversion methodology 800 then repeats from block 812.

Before returning to further discuss the alternative departure from block 818, asynchronous activity to USB controller is discussed. While the CPU 305 is, for example, executing application code or performing other tasks, asynchronous activity involving USB controller 501 may independently commence. Example asynchronous activity includes data input signals from keyboard 522, auxiliary device 27, or auxiliary device II 531 received by USB controller 501 as indicated in block 828.

After receiving data transferred from, for example, auxiliary device I 527, interrupt logic (not shown) in USB controller 501 issues an interrupt service request to CPU 505 as indicated in block 830. System controller I/O trap 592 intercepts the interrupt service request and issues an SMI to CPU 505 signal in the same manner as discussed above in conjunction with block 816. CPU 505 responds and executes SMM code 650 which determines that an interrupt service request has been received from USB controller 501. SMM code 650 then passes a read I/O instruction to CPU 505 which reads the data input stored in a USB controller 501 output buffer as indicated in block 834. SMM code 650 then proceeds to convert the data into a format recognizable by the executing programs, as indicated in block 836, and CPU 505 is requested by SMM code 650 to store the USB output buffer contents in a reserved SMM memory buffer within SMM memory 526 as indicated in block 838. SMM code 650 subsequently passes a request to issue interrupt instruction to CPU 505 addressed to interrupt request generator 597. Interrupt request generator 597 issues an interrupt to CPU 505 over an interrupt request line conventionally utilized by a conventional communication interface. Conversion methodology 800 proceeds to block 827, and SMM is exited in the manner described above.

CPU 505 next responds to the interrupt request from interrupt generator 597, and a conventional communication interface interrupt handler executes in block 812 and passes a read I/O device instruction to CPU 505. System controller I/O trap 592 determines that the requested I/O operation is associated with a communication interface address, as indicated in block 814, and conversion methodology proceeds to decision block 818 as described above.

Referring again to decision block 818, if SMM code 650 determines that an application code instruction requested a read (input from I/O device) operation to a trapped range, SMM code 650 proceeds to decision block 819 and determines whether or not the requested I/O instruction requested data received from an external device such as keyboard 522, auxiliary device I 527, or auxiliary device II 531. If external device input data is requested, SMM code 650, as indicated in block 840, instructs CPU 505 to read the data stored in the SMM memory buffer during execution of block 838 and to store the read data in register EAX. Conversion methodology 800 then proceeds to block 826 followed by blocks 827 and 812. Recall that the input data to USB in the SMM memory buffer was previously converted in block 836 into a format recognizable by application code. The application code may now retrieve data from register EAX, which is where the application code expects the data to be located, and the retrieved data is in an expected and recognizable format to the application code.

Referring again to decision block 819, if SMM code 650 determines that rather than requesting received external device data, application code requested a different read operation, for example, parallel interface status check, the conversion methodology 800 proceeds to block 838. SMM code 650 then instructs CPU 505 to read the requested information from the USB controller. For example, SMM code 650 requests a USB controller 501 status check. The USB controller 501 status check data is returned to CPU 505, and SMM code 650 converts the received status check information into a format recognizable to the requesting application code as indicated in block 836. SMM code 650 determines the proper format by examining the application code instruction and the associated destination address. SMM code 650 then instructs CPU 505 to store the requested, converted data in register EAX, where the data will be available and expected by the requesting application code. Conversion methodology then proceeds to block 826 to advance the saved EIP register contents in the manner described above followed by an exit from SMM as indicated in block 827 and a return to block 812.

As described above, conversion methodology 800 may provide seamless and transparent operations to a peripheral device that is unsupported by executing software. The SMM code 650 executes independent of the PC system 500 operating system(s), and generally no modifications to the OS are required. Although the transparent conversion of data transferred to and from a USB controller from a CPU has been described, it will be appreciated by those of ordinary skill in the art after reading this description that other components, either completely or only partially unsupported by executing software, may be accommodated within a computer system using the conversion methodology. Knowledge of specific I/O device instructions and hardware requirements is well-known in the art. For example, the embodiment of conversion methodology in FIG. 8 may be modified to support one or more unsupported components by programming system controller I/O trap 592 to issue SMIs upon encountering I/O operations to an address range of the unsupported components. SMM code 650 may be modified to recognize the application code instructions, modified to utilize the characteristics of the unsupported component, and modified to utilize the characteristics of components intended by the executing code to be accessed.

While the invention has been described with respect to the embodiments and variations set forth above, these embodiments and variations are illustrative and the invention is not to be considered limited in scope to these embodiments and variations. For example, as described above, conversion methodology 800 includes SMM code 650 which utilizes CPU 505 to convert requested instructions and data from an application program using conventional interface routines and formatting, and converts the requested instructions and data into a format acceptable to a USB controller. Additionally, SMM code 650 utilizes CPU 505 and system controller I/O trap 592 to intercept interrupt requests from USB controller 501 and perform the service requested. Although a particular embodiment of a conversion methodology involving a USB controller has been described, it will be understood by those of ordinary skill in the art after reading this description, that the conversion methodology may be used to facilitate utilization of connected hardware devices that include and/or require, for example, functions, protocols, addresses, and instructions that are unsupported by loaded application programs and OS programs. Also, although communication interface information is generally transferred one byte at a time using register AL, information transferred between other I/O devices or other communication interfaces and a CPU may be transferred using more than one byte. As a result, references to register AL may be substituted with references to AX, EAX, or other registers and variations thereof to accommodate the increased bandwidth. Although, a CPU is referred to herein, other processors including multiprocessing systems may be used. Accordingly, various other embodiments and modifications and improvements not described herein may be within the spirit and scope of the present invention, as defined by the following claims.

What is claimed is:

1. A computer system comprising:

a memory having a program stored therein;

a first hardware device having an address, wherein the first hardware device is at least partially unsupported by the program;

a processor, coupled to the memory and the first hardware device, that facilitates, during operation, attempted first information transfer from the program to a second hardware device at the first hardware device address and facilitates second information transfer from the first hardware device to the program, wherein the second hardware device is not present in the computer system; and an input/output trap, coupled between the processor and first hardware device to trap the first hardware device address and to issue a system management interrupt to the processor after any trap of the first hardware device address;

a converter, stored in system management mode memory and executable by the processor upon receipt by the processor of the system management interrupt, having access to the transferred information to convert the attempted first information transfer into a form recognizable by the first hardware device and transfer the converted first information to the first hardware device and to convert the second information transfer into a form recognizable by the program.

2. The computer system of claim 1 wherein the processor interrupts following information transfer to the hardware de address and stores current instruction pointer contents, and the converter accesses the transferred information by examining the information pointed to by the instruction pointer contents and by examining contents of an accumulator register of the processor.

3. The computer system of claim 1 wherein the first hardware device address is a member of a group of addresses that includes base addresses 03F8h, 02F8h, 03E8h, 02E8h, 378h, and 278h.

4. The computer system of claim 1 wherein the memory includes the system management mode memory.

5. The computer system of claim 1 wherein the first hardware device is a universal serial bus controller, and the program is an application program which does not support the first hardware device.

6. A method of interfacing between a program executing in a computer system and a first hardware device which is unsupported by the program, the method comprising the steps of:

attempting to transfer information between the program and a second hardware device to a predetermined address, wherein the program supports the second hardware device, does not support the first hardware device and the second hardware device is not present in the computer system;

trapping the predetermined address associated with the information;

issuing a system management interrupt to a processor of the computer system after trapping the address;

entering system management mode in response to the issued system management interrupt to allow the processor to operate independent of an operating system;

after entering system management mode, converting any information directed to the predetermined address into a format recognizable by the first hardware device using system management code;

transferring any converted information directed to the predetermined address to the first hardware device;

converting any information from the first hardware device to the program into a format recognizable by the program; and transferring any converted first hardware device information to the program.

7. The method as in claim 6 further comprising the steps of:

examining addresses associated with the information in the attempting to transfer information step;

determining with system management code a property of the information associated with the trapped first hardware device predetermined address; and responding with system management code to the trapped information property.

8. The method as in claim 6 wherein the first hardware device predetermined address is a member of a group of addresses that includes base addresses 03F8h, 02F8h, 03E8h, 02E8h, 378h, and 278h.

9. The method as in claim 6 further comprising the steps of:

receiving data in the first hardware device;

issuing a first hardware device interrupt request;

issuing a system management interrupt in response to the first hardware device interrupt request;

saving current instruction pointer contents;

entering system management mode (SMM);

executing SMM code;

reading the data received by the first hardware device;

converting the data into a format recognizable to the program;

storing the data in an SMM memory buffer; and issuing a communication device interrupt.

10. The method of claim 9 further comprising the steps of:

attempting to transfer information to the predetermined address;

issuing a system management interrupt in response to the attempted information transfer;

reading the data stored in the SMM memory buffer;

storing the data in a register;

advancing the saved instruction pointer contents; exiting SMM; and resume non-SMM program execution.

11. The method as in claim 7 further comprising the steps of:

executing a program I/O write instruction associated with an address, wherein the instruction is intended for the second hardware device;

trapping the address associated with the I/O write instruction;

after the step of trapping the address associated with the I/O write instruction, issuing a system management interrupt;

entering system management mode (SMM);

executing SMM code;

reading the contents of a register having the write instruction information content;

converting the contents in the register into a format of the first hardware device; and writing the converted contents to the first hardware device.

12. A method of supporting I/O devices in a computer system having a processor coupled to a memory and a first peripheral device, comprising the steps of:

executing a program;

providing an instruction for a second peripheral device from the memory to the processor, wherein neither the program nor an operating system of the computer system support the first peripheral device;

attempting to access an address of the first peripheral device associated with the instruction;

trapping the firs peripheral device address;

issuing a system management interrupt after a trap occurs in the trapping step to initiate the step of providing further instructions;

providing further instructions from the memory, independent of the operating system to the processor to convert the second peripheral device instruction into a first peripheral device instruction; and providing the first peripheral device instruction to the first peripheral device.

13. The method as in claim 12 further comprising the step of initiating monitoring for a range of addresses associated with the first peripheral device.

14. The method as in claim 12 further comprising the step of entering system management mode after the trapping step.

15. The method as in claim 14 farther comprising the step of exiting system management mode after providing the instruction to the second peripheral device to the first peripheral device.

16. The computer system of claim 1 wherein is capable of being programmed to trap a group of addresses including the first hardware device address.

17. The method of claim 6 wherein the first hardware device is a universal serial bus.

18. The method of claim 12 wherein the first peripheral device is a universal serial device, and the second peripheral device is selected from the group consisting of a parallel interface and a serial interface.

19. A computer system comprising:

means for executing a program and an operating system, wherein neither the program nor an operating system of the computer system support a second peripheral device;

means for storing information coupled to the means for executing;

means for providing an instruction for a second peripheral device from the memory to the means for executing, wherein the second peripheral device is unsupported by a program causing the instruction to be provided;

means for attempting to access an address of the first peripheral device associated with the instruction;

means for trapping the first peripheral device address;

means for issuing a system management interrupt after a trap occurs by the means for trapping;

means for providing further instructions, independent of the operating system and after a system management interrupt is issued by the means for issuing, from the means for storing to the means for executing to convert the second peripheral device instruction into a first peripheral device instruction; and means for providing the first peripheral device instruction to the first peripheral device.

20. The computer system of claim 19 further comprising:

means for providing further instructions, independent of the operating system and after a system management interrupt is issued by the means for issuing, from the means for storing to the means for executing to convert first peripheral device information into second peripheral device information; and means for providing the second peripheral device information to the means for executing.

21. The computer system of claim 19 wherein the first peripheral device is a universal serial bus.

22. A method of supporting peripheral devices in a computer system independent of an executing program and operating system, the method comprising the steps of:

issuing a system management interrupt to a processor;

entering system management mode of the computer system;

programming a system controller I/O trap to trap a predetermined first peripheral device address;

exiting system management mode;

loading operating system code into a memory of the computer system;

loading application code into the memory;

executing the application code;

determining whether the processor attempted an I/O operation to the predetermined first peripheral device address, wherein the I/O operation is intended for a second peripheral device;

if the processor attempted an I/O operation to an address different than the predetermined first peripheral device address, continuing the step of executing the application code;

if the processor attempted an I/O operation to the predetermined first peripheral device address, the method comprises the steps of:
trapping the predetermined first peripheral device address;
after the step of trapping, issuing a system management interrupt from the system controller I/O trap to the processor;
storing current registers of the processor in response to the system management interrupt;
entering system management mode;
executing system management mode code stored in the memory independent of the operating system;
determining a type of the I/O operation;
if the I/O operation is a 'write data' request, the method comprises the steps of:
determining a data content of the first peripheral device I/O operation; and
issuing instructions from the system management mode code to the processor to convert the data content into a format for the first peripheral device from a format for the second peripheral device; and
exiting system management mode; and
if the I/O operation is a 'read data' request, the method comprises the steps of:
determining a type of the 'read data' request I/O operation;
if the I/O operation 'read data' request type is a response to a first peripheral device interrupt request, the method comprises the steps of:
reading input data from the first peripheral device;
converting the input data from the first peripheral device into second peripheral device format; and
storing the converted input data in a memory buffer;
if the I/O operation 'read data' request type is a request to read previously
stored converted input data from the first peripheral device, the method comprises the steps of:
reading the data from the memory buffer; and
providing the read data available to the processor;
if the I/O operation 'read data' request is a request to read information from the second peripheral device, the method comprises the steps of:
retrieving the requested data from the first peripheral device;
converting the retrieved data to the second peripheral device format; and
providing the retrieved and converted data to the processor.

* * * * *